Figure 2:
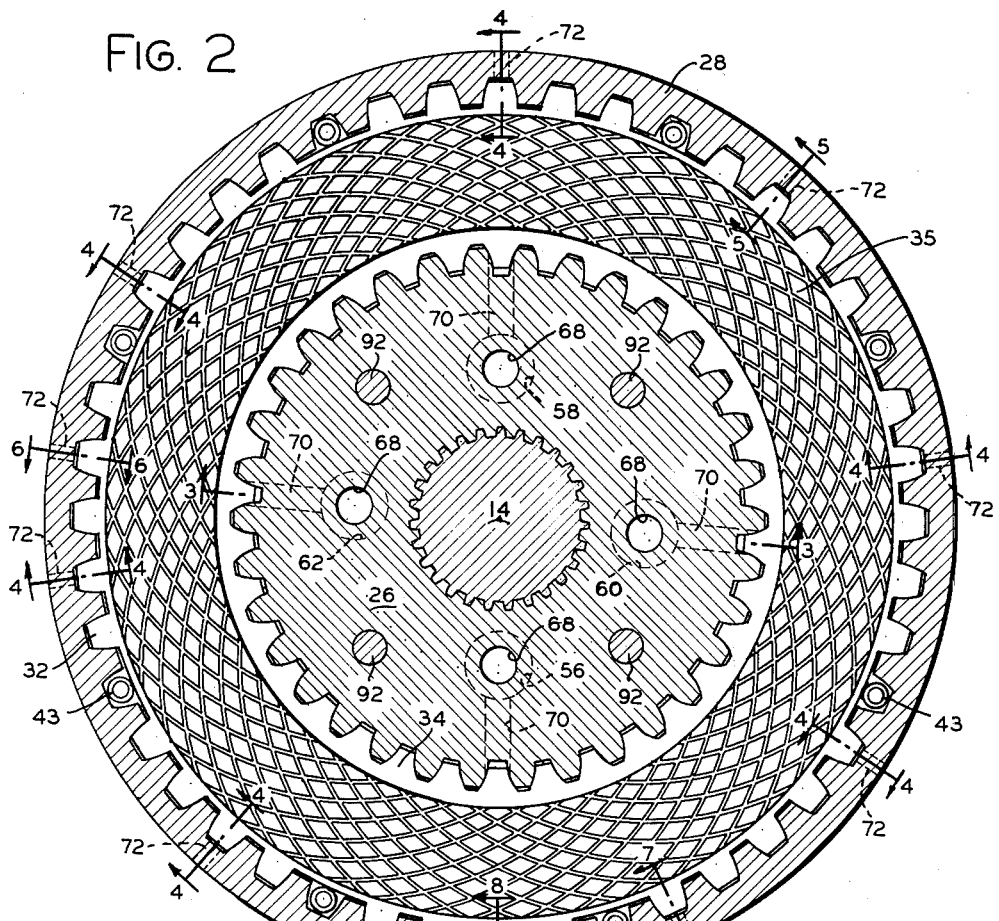
Figure 4:
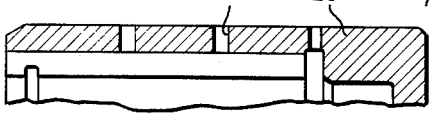
Figure 7:
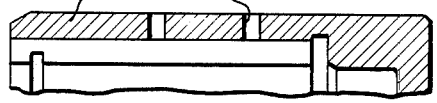
Figure 5:
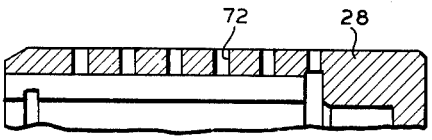
Figure 8:
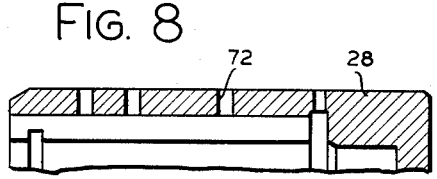
Figure 6:
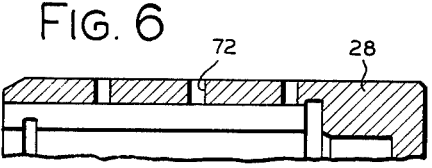

Aug. 24, 1965    H. V. MERRITT ETAL    3,202,253
CLUTCH COOLING MEANS

Filed Dec. 4, 1961    2 Sheets-Sheet 1

FIG. 1

FIG. 3

INVENTORS
HOWARD V. MERRITT
RONALD H. BOLSTER
BY
Kenneth C. Witt
ATTORNEY

Aug. 24, 1965   H. V. MERRITT ETAL   3,202,253
CLUTCH COOLING MEANS
Filed Dec. 4, 1961   2 Sheets-Sheet 2

*INVENTORS*
HOWARD V. MERRITT
RONALD H. BOLSTER
BY Kenneth C. Witt
ATTORNEY

United States Patent Office 3,202,253
Patented Aug. 24, 1965

3,202,253
CLUTCH COOLING MEANS
Howard V. Merritt and Ronald H. Bolster, Jackson, Mich., assignors to Clark Equipment Company, a corporation of Michigan
Filed Dec. 4, 1961, Ser. No. 156,733
1 Claim. (Cl. 192—113)

This invention relates to means for cooling clutches, and more specifically to cooling means for multiple disc clutches.

Multiple disc clutches can be used advantageously in many applications, and they are widely used in mechanisms such as constant mesh gear transmissions. For an example of such a transmission using multiple disc clutches reference may be had to U.S. Patent No. 2,867,126 Bolster, dated January 6, 1959, which is assigned to the same assignee as the present application.

When a multiple disc clutch is used with such a transmission, there are certain operating conditions under which it may absorb a large amount of energy which is transformed into heat that must then be dissipated. For example, in the above-mentioned transmission which is used in certain types of heavy construction machinery, one multiple disc clutch controls the rotation of the output shaft to drive the associated vehicle in a forward direction while another such clutch controls the output shaft to give the vehicle a reverse direction. The arrangement of the transmission is such that when one of the direction controlling clutches is engaged the other is disengaged and alternate discs of the pack of interleaved friction discs rotate in opposite directions. The result is that the relative speeds between alternate discs are higher than would be the case even if half of the discs were held stationary while the alternate discs rotated at normal speed. This penomenon is well-known in constant mesh transmissions and is brought about by the fact that all gears are constantly in mesh whereby all gears and the clutch discs associated therewith rotate whenever the transmission is in operation. In the aforementioned transmission the gear ratios are such that when the forward clutch is engaged the alternate discs in the reverse clutch have a relative rotational speed of approximately double the engine speed, and the same is true for the forward clutch discs when the reverse clutch is engaged. In many situations such relative spinning speeds between the alternate clutch discs are even greater than double the normal clutch speed. Because there is a certain amount of frictional contact between adjacent discs in a multiple disc clutch even when it is disengaged but running idle as described, there is heat generated in the clutch by the friction under such conditions, the amount of heat varying generally with the relative rotational speeds between adjacent discs. Such heat must be taken away from the clutch, otherwise it may overheat and sustain damage.

When a transmission of the type just discussed is used in construction machinery such as tractor shovels and bulldozers the direction controlling clutches may be subjected to very severe usage, because in operation many such machines are continually shifted between forward and reverse. Such forward and reverse shifting may occur while the vehicle is moving at relatively high speed if the operator does not utilize the brake to slow down the vehicle—as frequently occurs, and in some circumstances the shifting occurs while the vehicle is loaded. With each such change in direction, one of the direction controlling clutches has to absorb the entire energy of the moving vehicle and its load, if any, and with many vehicles this can amount to a mass of many tons. The amount of heat generated in the direction controlling clutches during such operation is very large. Unless this heat can be dissipated quickly, the clutches may overheat and be damaged.

Numerous constructions and methods have been proposed for cooling multiple disc clutches such as the use of cooling fluid as well as special groove patterns in the clutch discs as shown in Patent 2,690,248 McDowall, the use of air shrouds for the disc pack as shown in Patent 2,869,659 Mayo, and many others. However, until the present invention there was no construction or method satisfactory for many multiple disc clutches which are subjected to very severe service such as use as forward and reverse clutches in transmissions for construction machinery as discussed hereinbefore.

The object of the present invention is to provide a more effective and more efficient structure for cooling multiple disc clutches.

In carrying out our invention in one preferred form thereof, we provide a chamber associated with the inner hub portion of a multiple disc clutch, a nozzle for admitting a liquid coolant to the chamber, and passage means for admitting air or other gas coolant to the chamber where it is mixed with the liquid coolant. Passages are provided through the inner hub member, through the interleaved discs and through the outer drum member of the clutch to enable the mixture of liquid and gas coolants to pass through the clutch at all times in intimate relation therewith in order to effectively remove the heat.

The above and other objects, features and advantages of our invention will become more readily apparent to persons skilled in the art from the subsequent description when taken in conjunction with the accompanying drawing wherein:

FIGURE 1 is a logitudinal sectional view of a multiple disc clutch embodying our invention, FIGURE 2 is a cross-sectional view taken along line 2—2 of FIG. 1, FIGURE 3 is a sectional view taken along line 3—3 of FIG. 2, and FIGURES 4 through 8 are fragmentary sections taken along the lines 4—4, 5—5, 6—6, 7—7 and 8—8, respectively, in FIG. 2.

Referring now to the drawing, the numeral 10 refers to a multiple disc clutch adapted for use with a constant mesh gear transmission (not shown) and located within a clutch housing 12. The multiple disc clutch 10 is arranged to connect a rotatable center shaft 14 to a rotatable quill shaft 16, when desired, so that quill shaft 16 will rotate with shaft 14. Shaft 14 is journaled for rotation within quill shaft 16 by means of a plurality of roller bearings 18, only one of which is shown, and quill shaft 16 is journaled at one end thereof in stationary frame member 20 by means of a tapered roller bearing 22.

The multiple disc clutch 10 includes an inner disc carrier or hub member 24 splined to shaft 14 at 25 for rotation therewith and held in place by a snap ring 26, an outer disc carrier or drum member 28 splined to quill shaft 16 at 29 for rotation therewith and held in place by a snap ring 30, a plurality of axially movable friction discs 32 splined to drum member 28 for rotation therewith and a plurality of axially movable friction discs 34 interleaved with friction discs 32 and splined to hub member 24 for rotation therewith. Each of the discs 34 of the set which is connected to the hub 24 has a groove pattern of the configuration shown in FIG. 2 on both sides of the disc. The friction surfaces containing the groove pattern may desirably be made of sintered bronze by a known process, and the intervening discs 32 may be made of steel, although other combinations of materials may be used if desired without departing from the present invention. It will be readily appreciated that the groove patterns could be in discs 32 instead of discs 34 if desired.

The friction discs 32 and 34 are disposed between an axially movable annular piston 40 and an annular backing plate 36 carried by drum member 28 and held from axial movement by a snap ring 38. The piston 40 forms with drum member 28 an annular chamber 42 which can be put in communication with pressure fluid, thereby causing piston 40 to move toward backing plate 36 and to press friction plates 32 and 34 together with the result that shaft 14 and quill shaft 16 are frictionally connected together for conjoint rotation. An annular member or ring 43 is secured to the inner surface of the right closed end of drum member 28, and, as illustrated in FIG. 1, piston 40 is provided with a groove 41 into which ring 43 fits at all times. Ring 43 because of a limited clearance at the adjoining surfaces 45 between ring 43 and piston 40 in effect separate chamber 42 into inner portion 42a and outer portion 42b and also restricts the fluid flow from portion 42a into 42b. Therefore, when pressurized fluid is admitted initially to portion 42a of the chamber to initiate engagement of the clutch the initial movement of piston 40 toward the left is rapid because of the relatively small volume of portion 42a of the chamber which must be filled with fluid to initiate movement. At the same time pressurized fluid is being metered into chamber 42b past ring 43 and surface 45 with the result that the force exerted by the piston is much greater than initially because of the much larger surface of piston 40 which is exposed to the pressurized fluid. Thus, it will be understood that the construction described and illustrated provides for rapid engagement of the clutch followed by an increase in pressure on the discs which assures complete engagement and acts to prevent slippage during operation. Also disposed between backing plate 36 and piston 40 are a plurality of axially disposed return springs 43 arranged to urge piston 40 away from backing plate 36, and so return the clutch to its disengaged position when the fluid pressure in chamber 42 is relieved.

The annular chamber 42 is supplied with pressure fluid by means of a passage 44 connecting the chamber 42 with a radially extending passage 46 passing through quill shaft 16. The passage 46 connects with an annular passage 47 in the outer surface of an annular oil distributor ring 50 disposed between shaft 14 and quill shaft 16. The distributor ring 50 is secured to shaft 14 and a pair of sealing members 49 and 51 are provided to prevent leakage of fluid from annular passage 47 axially between shaft 14 and quill shaft 16. Chamber 47 is in communication through a plurality of radially extending openings 48 (only one of which is visible in FIG. 1) with an inner annular chamber 53 which connects with a radially extending passage 52 located in shaft 14 which communicates with a longitudinally extending passage 54 located in shaft 14. The passage 54 communicates in turn with a source of pressure fluid via a control valve (not shown).

Located in hub member 24 are four, spaced apart, axially extending bores 56, 58, 60 and 62. One end of each of these bores (the right end as viewed in FIG. 1) opens into an annular counterbore 64 within which is disposed a baffle ring 66. The function of counterbore 64 and baffle ring 66 will be explained hereinafter. The other end of each bore has a reduced diameter portion 68 which cooperates with baffle ring 66 to maintain a predetermined depth of cooling liquid in each of the bores since otherwise any cooling liquid directed to the bores would spill over the edges of hub member 24. Bores 56, 58 and 60 have a pair of radially extending passages 70 connecting the respective bores with the external splined portion of hub member 24. Bore 62 has a single passage 70. These passages 70 serve to conduct coolant from the bores in hub member 24 outwardly to friction discs 32 and 34, the coolant then moving outwardly between discs 32 and 34 due to the centrifugal force exerted thereon. Taking FIGS. 1 and 3 together it will be seen that passages 70 are arranged so that each passage 70 directs coolant equally to different pairs of areas adjacent the inner edge of friction discs 32 in order to provide optimum coolant distribution. The drum member 28 is provided with a series of coolant outlet passages 72 extending through drum member 28 so that coolant which has passed over plates 32 and 34 can escape from the interior of drum member 28. Liquid coolant which is thrown from drum member 28 is contained within clutch housing 12 from which it drains back to a liquid reservoir (not shown). The spacing of coolant passages 72 (see FIGS. 2 and 4–8) is such that coolant is carried away from the clutch plates as fast as it is conducted to them since the area of passages 72 receiving coolant from each passage 70 is somewhat greater than the area of passages 70. Although there are thirty-three of the passages 72 located in drum member 28, the strength of drum member 28 is not significantly decreased because of the wide spacing of passages 72. It will now be appreciated that fluid passages 70 and 72, along with grooves 35 provide a means for evenly distributing cooling fluid between plates 32 and 34 either during engaged or disengaged operation of clutch 10.

In the operation of clutch 10, the friction discs 32 and 34 are constantly being cooled whether the clutch is engaged or disengaged, since discs 34 are provided with grooves 35 so that passages for the flow of coolant between discs 32 and 34 are provided even when the clutch is engaged.

Liquid coolant, usually oil, is supplied to the bores 56, 58, 60 and 62 from two sources. One such source of cooling liquid is transmitted through drum member 28 and quill shaft 16 via fluid passages 74, 76, 78 and 80 to an annular groove 83 in oil distributor ring 50 between fluid seals 51 and 81 where it is directed by means of a radially extending passage 85 to an axially extending fluid passage 82 located in oil distributor ring 50 into the space 15 between shaft 14 and quill shaft 16 adjacent roller bearing 18. Passages 78 and 80 are shown rotated approximately 45° out of their actual position in FIG. 1 and actually are not joined at the same spline as passages 44 and 46. The low pressure cooling liquid then flows through roller bearing 18 and along quill shaft 16 where it drops off the end thereof, and thus into the annular counterbore 64 between baffle ring 66 and the bores 56, 58, 60 and 62 as shown by the arrows in FIG. 1. The cooling liquid then flows into the various bores and hence out across plates 32 and 34 via fluid passages 70. The liquid cooling arrangement just described provides a portion of the cooling of clutch 10.

In order to further cool clutch 10, an additional supply of liquid coolant is directed to bores 56, 58, 60 and 62 via a conduit 86, a nozzle 88 which is threadably secured to housing 12 and a cap 90 which covers the end of shaft 14 and is secured to hub member 24 by means of machine screws 92. The cap 90 has an annular coaxial opening 94 therein of a substantially larger diameter than nozzle 88 and through which nozzle 88 extends. Due to the fact that clutch 10 throws coolant from passages 72 because of the centrifugal force acting on the coolant, cooling air or gas from inside housing 12 is pulled into clutch 10 through opening 94 around nozzle 88. As cooling air is pulled into clutch 10, it enters a mixing chamber 96 defined by cap 90, shaft 14 and hub member 24. Liquid coolant from nozzle 88 is directed into chamber 96, and since it impinges against the end of shaft 14, a general mixing of the liquid and air entering the chamber 96 is achieved, so that a mixture of liquid and air is delivered to the several bores in hub 24. This mixture of liquid and air apparently takes the form of an aerated liquid or foam, at least it has been observed that it is in this condition when it is discharged from clutch drum 28 through the discharge passages 72. The circulation of air through the interior of the clutch in this manner apparently has the effect of equalizing the air pressure in the clutch and inside the clutch housing, thus eliminating low pressure spaces within the clutch which are thought to have existed in prior art constructions, the assumption being that such low pressure spaces did not receive adequate coolant and therefore tended to produce hot spots or localized areas of increased temperature in the clutch. It is thought too that the circulation of air through the clutch pack and back through the clutch housing in the manner described aids in the removal of heat from the clutch by transferring heat by conduction to the housing from which it is transferred by radiation and convection to the outside atmosphere. The foam which is delivered from mixing chamber 96 to bores 56, 58, 60 and 62 substantially fills these bores along with annular space 84 thereby providing greater contact of the coolant with the various surfaces of the clutch with the result of increased heat transfer between the clutch and the coolant. It will be appreciated also that "foam" tends to cling to surfaces over which it passes, and thereby promotes cooling of such surfaces. A common illustration of this effect is found in the splashless type aerators now found on many water faucets.

The liquid coolant which passes over plates 32 and 34 flows off the open end of drum 28 onto housing 12 from which it drains via opening 98.

It will be appreciated from the foregoing that this invention achieves the objectives set out hereinbefore. Moreover, it does this without the necessity of providing a lubricant conduit in the shaft such as has been done in many prior art structures. Such lubricant conduits in the shaft add materially to the cost because of the boring operations required, and in addition they provide a potential weak spot in the shaft and hence a source of possible trouble.

While we have illustrated and described our invention herein as applying to a clutch, it will be appreciated that it is equally applicable to a multiple disc brake since the only difference between the two devices is in the manner in which they are applied, that is, a clutch is utilized in connecting two members together for rotation while a brake is utilized to connect two members together in order to stop one of them.

While we have shown and described a preferred embodiment of our present invention, it will be understood that various re-arrangements and modifications may be made therein without departing from the spirit and scope of this invention.

We claim:

A multiple disc friction engaging device comprising, an outer drum member, a first plurality of friction plates carried by the said outer drum member internally thereof, an inner hub member located within and coaxially of the said drum member, the said hub member being carried by a shaft adjacent one end thereof, a second plurality of friction discs carried externally by the said hub member and interleaved with the first-mentioned friction discs, a cap member secured to the said inner hub member for rotation therewith, substantially covering the said shaft end and forming with the said inner hub member and the said shaft end a mixing chamber, a non-rotatable housing surrounding the said outer drum member and the other aforementioned portions of the friction engaging device, the said cap member having a centrally located opening therein, means for discharging a liquid into the said chamber to impinge against the said shaft end including a conduit extending through the said housing and aligned with the said opening, the said opening admitting air to the said chamber for mixing with the said liquid, passage means for circulating the mixture of liquid and air radially outwardly over the friction discs, and other passage means within said housing providing for the return of the air from the said mixture to the mixing chamber after the mixture has been discharged from said outer drum member.

References Cited by the Examiner

UNITED STATES PATENTS

| 2,803,764 | 4/57 | Lundskow. |
| 2,837,192 | 6/58 | Dunkelow. |
| 2,953,040 | 9/60 | Christenson et al. |
| 3,007,555 | 11/61 | Eames. |
| 3,033,319 | 5/62 | Wrigley et al. _____ 192—107 X |
| 3,044,736 | 7/62 | Chambers. |

FOREIGN PATENTS

| 220,151 | 3/10 | Germany. |
| 579,061 | 6/33 | Germany. |
| 150,301 | 10/20 | Great Britain. |

DAVID J. WILLIAMOWSKY, *Primary Examiner.*

THOMAS J. HICKEY, *Examiner.*